United States Patent [19]

Guillaume

[11] 4,189,229

[45] Feb. 19, 1980

[54] ENLARGER

[75] Inventor: Emile A. H. Guillaume, Ballaigues, Switzerland

[73] Assignee: Zelacolor Systems Establishment, Vaduz, Liechtenstein

[21] Appl. No.: 883,470

[22] Filed: Mar. 6, 1978

[30] Foreign Application Priority Data

Mar. 8, 1977 [CH] Switzerland ............... 2854/77

[51] Int. Cl.² .................................. G03B 27/54
[52] U.S. Cl. .......................................... 355/67
[58] Field of Search ............... 355/32, 35, 37, 38, 355/77, 67–71

[56] References Cited

U.S. PATENT DOCUMENTS

| | | | |
|---|---|---|---|
| 1,633,228 | 6/1927 | Rogers | 355/67 |
| 2,415,635 | 2/1947 | Hopkins | 355/67 |
| 2,923,812 | 2/1960 | Hauptvogel | 355/67 X |
| 3,031,922 | 5/1962 | Stadler | 355/35 |
| 3,748,037 | 7/1973 | Külterer et al. | 355/71 |

FOREIGN PATENT DOCUMENTS

836892  6/1960  United Kingdom ............... 355/67

*Primary Examiner*—Donald A. Griffin
*Attorney, Agent, or Firm*—Ostrolenk, Faber, Gerb & Soffen

[57] ABSTRACT

The invention relates to an enlarger, especially for the production of photographic enlargements or precision screens. The enlarger comprises a head enclosing a light source and a diffusing screen, the light source being disposed behind the diffusing screen, a film slide channel having an exposing opening or window, and an enlarging lens. The light source has the form of an annulus located close to the diffusing screen and arranged such that the diffusing screen or plate surface, seen from the lens, is contained effectively within a projections area being orthogonal to the light source annulus. The light source can be lifted and lowered within the head in order to adjust for substantially uniform light intensity in the projected surface.

11 Claims, 4 Drawing Figures

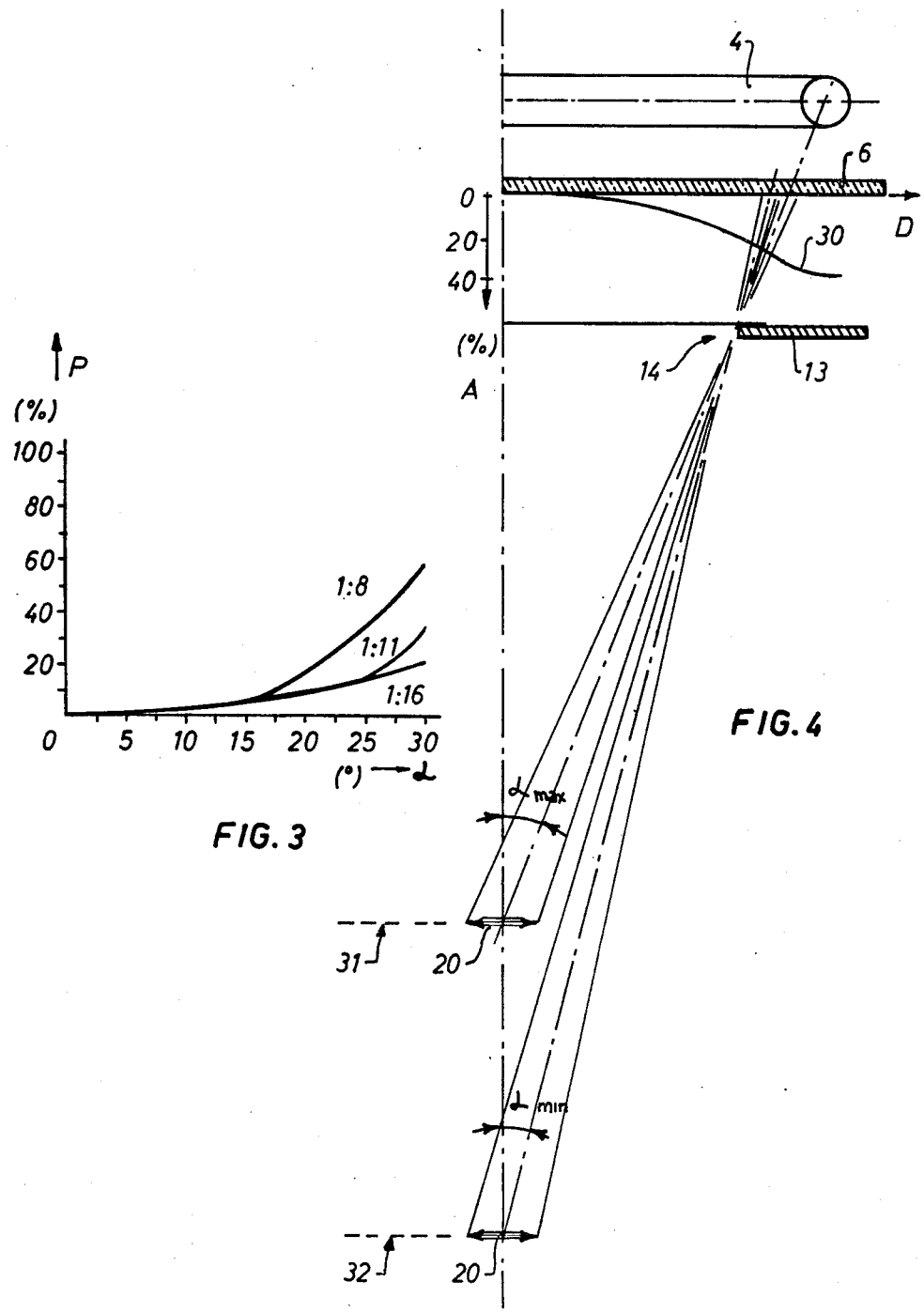

ENLARGER

The object of the invention is an enlarger, intended more particularly for producing enlargements or precision screens.

When a uniformly lit surface is projected by means of a lens, the light intensity of the image decreases from the centre towards the edges, in a manner approximately proportional to the $\cos^4$ of the projection half-angle. This variation in the light intensity of the image from the centre (maximum) towards the edges (minimum) is found in all enlargers. The technician in the trade refers to a loss of luminosity at the edges of the image due to vignetting of the lens, or more simply to a centre to edge loss.

As an example, in order to obtain precision screens or grids, it is important to ensure very uniform lighting of the film, since lithographic films used for such work have very rapid gamma.

In small format originals, it is always necessary to enlarge considerably. For mechanical reasons (winding, vibration etc.) as well as optical reasons, it is best to use lenses with the shortest possible focal length, i.e. to increase the projection angle. Unfortunately, as the projection angle is increased, the loss of light becomes very considerable at the edge of pictures. Consequently, in order to compensate this disadvantage, it is necessary to light the original more strongly at the edges than at the centre, in a manner which is inversely proportional to the vignetting of the lens.

Enlargers have thus been proposed, which are supplied with compensation films located before the lens or before the diffuser plate. Such films are subject to grey degradations starting from the centre and becoming lighter towards the edges. In this manner, losses due to vignetting of the lenses are compensated by restriction of the light at the centre.

According to the invention, the same effect is obtained much more easily by lighting a diffuser located between the original and the light source, by means of a circular light source, thus ensuring a luminous degradation inversely to the lens vignetting.

It has also been noted that the light variation fluctuates with the projection angle. It may thus be necessary to modify the correction according to this angle.

The enlarger according to the invention, comprising a head containing a light source located behind a diffuser plate, a film slide complete with exposure shutter and a lens, is characterised in that the light source is in the form of an annular lamp located closely to the diffuser plate and arranged in such a manner, that the diffuser plate surface as seen by the lens is preferably contained essentially within the orthogonal projection area of the annular source.

According to a preferred design, the enlarger comprises means for adjusting the light source, the said means being arranged so as to allow movement of the source in relation to the diffuser plate.

In an extreme setting position, the adjuster means may be arranged to allow the annular lamp to be applied against the diffuser plate, and may consist of a tube holding component, secured in a mobile and sliding manner on a side wall of the enlarger head.

The tube holding component may be secured to the head by means of a screw and may have a groove arranged so as to slide on the screw shank.

The light source may have a xenon or a neon light tube.

As an example, the drawing shows a design for the enlarger head according to the invention.

In the drawing:

FIG. 3 is a diagram showing the centre to edge loss of a normal lens in accordance with the projection half-angle, and FIG. 4 is an explanatory sketch showing the position of the light source in the head of the design in FIG. 1 for optimum adjustment of the enlarger.

Figure 1:
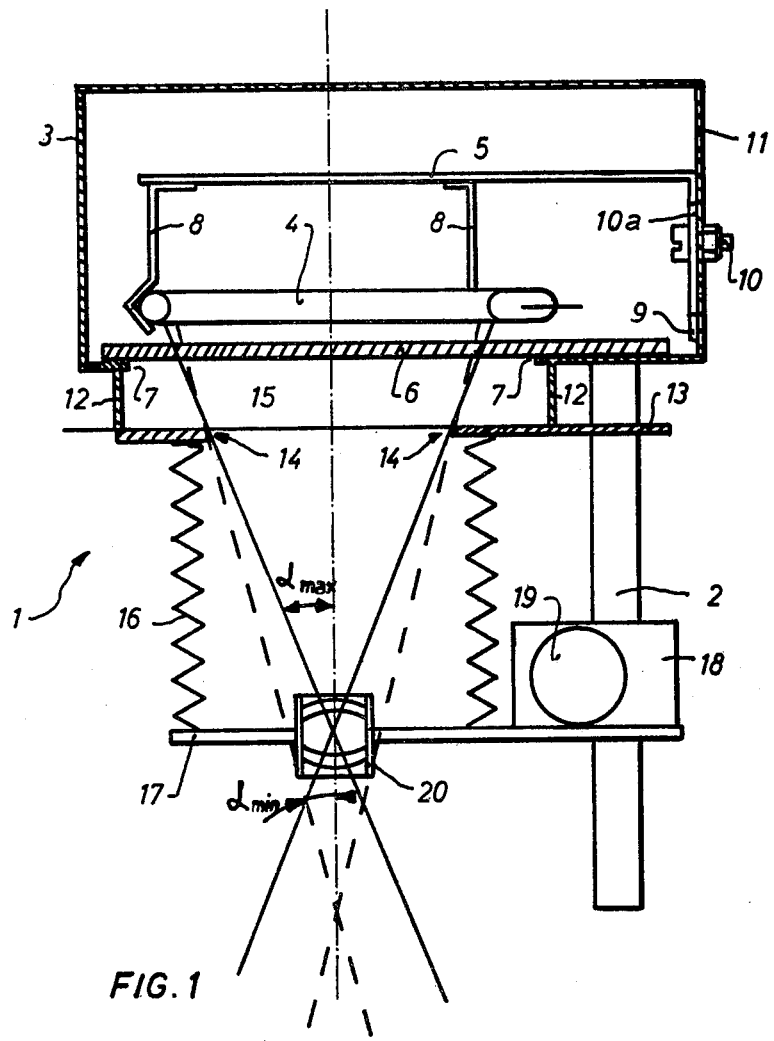
FIG. 1 is a sectional view of the enlarger head shown schematically.
Figure 2:
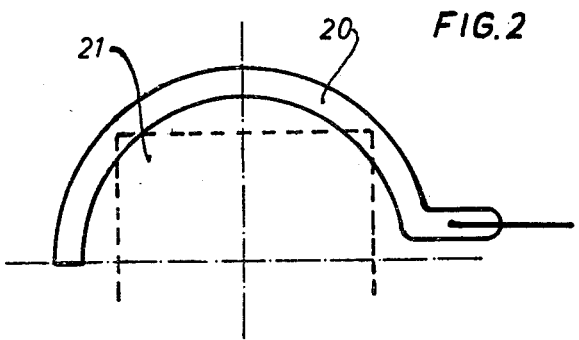
FIG. 2 is a view from beneath part of the head seen from the lens.

The enlarger head 1 shown in FIGS. 1, 2 and 4 comprises a vertical rod 2 secured to a light-diffusion housing 3 enclosing a light source 4. The said light source 4 is maintained in the housing 3 by means of a support arranged so as to allow the light source to be raised or lowered inside the housing 3, so as to bring it closer to- or further away-from a diffuser plate 6 located at the base of the housing 3 opposite an opening 7. The light source 4 is in the form of a ring located opposite the opening 7 and the support 5 has a base-plate on which the lugs 8 retaining the light source 4 in position are located. The annular light source 4 is a fluorescent tube, for instance a neon- or a xenon-tube. The support 5 presents a part at right-angles 9 secured by means of a screw 10 within a slot 10a, against a side wall 11 of the housing 3, so as to allow vertical movement. In the lower part of the housing 3, around the opening 7, a frame 12 is provided, on which a film-guide 13 is mounted having a window 14, above which a film 15 moves, bearing the originals to be enlarged or screened. One end of a set of bellows 16 is located against the film-guide 13, the other end of the bellows 16 being applied against a lens plate 17 integral with a setting arrangement 18, comprising a knob 19 actuating a toothed wheel not shown here and meshing with a rack also not shown here and integral with the vertical rod 2. A lens 20 is finally mounted at the centre of the lens-plate 17.

The enlarger head as just described is secured to a frame or static mount not shown here, so as to allow it to be taken further away from- or closer to- a working surface carrying the screening support, the prints or the relevant selections to be produced, etc.

The enlarger as just described with reference to FIG. 1 operates in the following manner:

The original of film 15 is placed in position and the enlarger head is taken further away from- or closer to- the working surface not shown here, so as to select a distance between the head 1 and the working surface in accordance with the required enlargement of the image to be projected on the working surface intended to receive the print, the selection or the screening support, etc. The definition of the image is then adjusted by moving the lens 20 by means of knob 19. When the setting has been completed, the support for the print, selection, screen etc., is placed in position on the working surface and the light source 4 is energised for the necessary period to sensitize the print, selection, screen, etc.

The technician will note immediately that the lens 20 in the setting position shown in FIG. 1 "sees" through opening 14, according to a half-angle $\alpha$ included between $\alpha_{max}$ and $\alpha_{min}$, a clearly defined surface of the diffuser plate 6 shown in 21 in FIG. 2, the said surface 21 being the projection of the contour of the opening 14 from the centre of the lens 20. The technician will also perceive that the size of this surface 21 varies according to the adjustment of the head or the enlargement which is required.

In FIGS. 1 and 4, two projection half-angles $\alpha_{max}$ and $\alpha_{min}$ represent the maximum and minimum enlargement settings to be obtained with the enlarger head shown in FIG. 1. The light source 4 is of such a size, that as seen in FIG. 2, it may be seen by the lens through projection 21 of the opening 14 with the $\alpha_{max}$ half-angle.

The technician will easily understand that when the annular tube 4 is located in its lowest position within the housing 3, i.e. when the tube 4 touches the diffuser plate 6, the light intensity from the plate side as seen through the lens 20 is at its maximum in the annular area of the plate located beneath the tube 4 and decreases in the direction towards the centre of the plate.

The fact that the tube 4 is removed from the plate 6 by unscrewing the nut 10, sliding the support 5 towards the top, allows the attenuation of the difference in intensity between the annular area beneath the tube 4 and the centre of the plate. When the tube 4 is in its highest position, the support 5 being located against the upper part of the housing 3, there is practically no more difference in light intensity between the centre of the plate 6 and the annular area of the plate located beneath the tube 4. Clearly the adjustment of the height of the tube 4 in relation to the diffuser plate 6 allows compensation of the light-loss due to vignetting for whatsoever type of lens. Clearly this correction depends theoretically on the adjustment of the lens 20, i.e. the distance between the lens 20 and the diffuser plate 6. Nevertheless, the technician will note when examining FIG. 1 that between the two extreme operational positions of the head 1 represented by the $\alpha_{max}$ and $\alpha_{min}$ half-angles, there is very little variation in the area 21 seen by the lens. In consequence, when the setting of the tube 4 height in relation to a diffuser plate 6 is effected for a lens adjustment in a position equal to the maximum enlargement, for instance a lens position as shown in FIG. 1, the said height adjustment of the tube will be satisfactory for the enlargements represented for the half-angles going from $\alpha_{max}$ to $\alpha_{min}$.

In order to ensure a suitable adjustment of the enlarger with a predetermined lens, it will consequently suffice to position the enlarger head 1 for maximum enlargement equal to the $\alpha_{max}$ projection half-angle, and to adjust the distance between the annular tube 4 and the frosted-glass plate 6 by means of the screw 10, by measuring the light intensity of the projection from the opening 14 onto the working surface not shown here for the enlarger with a photo-electric cell. After a number of measurements at the centre and at the edges of the surface, the technician is easily able to locate the tube 4 at a suitable distance from the frosted glass 6 so that the light intensity at the centre and on the edges of the surface projected onto the working surface remains constant. The fact that the adjustment made for a maximum enlargement remains correct for all other enlargements effected with the same lens is explained in detail by means of FIGS. 3 and 4.

FIG. 3 shows the loss of light intensity P due to the lens, as a percentage of the function of the projection half-angles $\alpha$, for shutter openings of 1/16, 1/11 and ⅛. The diagram in FIG. 3 is well known by the technician and is provided by the maker of all high quality lenses.

When looking at this diagram it will be seen that as the projection half-angle $\alpha$ increases, the light intensity reduces. This loss of light intensity which increases on approaching the edges of a projected image, is compensated by a surplus of light intensity supplied by the annular source 4 on the edges of the frosted glass plate 6 as seen by the lens. This surplus of light intensity A in percentage from the edges, as related to the centre and on the plate 6, is represented in a diagram in FIG. 4 by the curve 30 as a function of the distance D from the enlarger axis. For the technician, when comparing the light source surplus intensity curve 30 at the edges in relation to the centre, and the curves for loss of light intensity in the diagram in FIG. 3, it becomes clear that the centre to edge losses of the lens may be compensated.

In FIG. 4, the $\alpha_{max}$ projection half-angle is equal to 22° and represents a ×10 enlargement given by the position 31 of the lens 20, and the 60 $_{min}$ projection half-angle is equal to 15° representing a ×2 enlargement given by the position 32 of the lens 20. As explained further up, the centre of the annular section of the tube 4 is seen by the lens below the $\alpha_{max}$ half-angle through opening 14, and it is in that position that the adjustment is effected. It has been noted that this setting remains valid for all $\alpha$ half-angle values from $\alpha_{max}$ to $\alpha_{min}$. This is explained by the fact that providing the adjustment gives a constant light intensity for the image projected upon the working surface for a half-angle of $\alpha$ equals 22°, the said light intensity will remain constant for an angle of $\alpha_{min}$ equals 15° for instance, since for that angle the lesser loss of light intensity at the edges of the plate 6 and consequently a lesser surplus of light intensity (please see curve 30). The distribution of light intensity over the working surface thus remains absolutely constant for the half-angles going from $\alpha_{max}$ to $\alpha_{min}$, and thus for enlargements of ×10 to ×2 approximately, when the adjustment is effected for $\alpha_{max}$.

In a preferred design, which has given excellent results, the enlarger has a lens with a 100 mm focal length, and an aperture giving a 90 mm diameter image. The distance between the tube 4 and the frosted glass plate 6, as well as the distance between the frosted glass plate and the opening is ⅓rd focal length approximately. The enlarger head working height varies between 4 and 12 focal lengths (1.2 meters) for enlargements of ×2 to ×10, representing projection half-angles of 15° to 22°.

Experience shows that adjustment comprising components 5, 9, 10 and 10a is only required where several lenses are supplied with the enlarger head. In a simplified variation of the head arranged for use with a single lens, no adjustment is provided for the distance between the tube and the frosted glass.

Clearly the enlarger as described here may undergo modifications, or improvements, without going beyond the framework of the present invention.

As an example, the annular light source, instead of a tube may consist of a number of light points or tube parts distributed uniformly along a circumference. Nevertheless tests have shown that the best results are obtained by means of a lamp having an annular form. The annular light source may also consist of incandescent lighting.

The invention resides in the fact that the light source is arranged to provide a more intense distribution of light at the edges of the projected light cone than at the centre of the said cone, in such a manner as to compensate the centre to edges loss due to vignetting of the lens, the said compensation being ensured by the shape of the positioning of the light source in the enlarger head, and not by means of filter or degradation masks.

Preferably, the light source in the form of a ring will have a greater diameter than the width of the opening in the film-slide, so that the light source may be seen along the diagonal of the opening from the lens. According to another provision derived from the preferred design provided herein, the diameter of the light source in the form of a circular ring may be effectively equal to the focal distance of the lens, it being understood that the opening is of slightly smaller size than the focal distance of the lens.

I claim:

1. Enlarger, comprising:
   an enlarger head;
   a light source in the enlarger head; the light source being annular in shape and having an axis; the light source directing light out of the head and along the light source axis;
   a diffuser plate on the head and placed so that light from the light source passes by the diffuser plate as the light is directed out of the head; the light source being positioned near to the diffuser plate such that light from the light source directly impinges upon the diffuser plate;
   a film guide for supporting an original to be enlarged, the film guide having an exposure window therethrough; the film guide being placed such that light passing the diffuser plate passes the film guide and the exposure window therethrough;
   a lens spaced from the exposure window and at the side thereof away from the diffuser plate;
   the diffuser plate being arranged with respect to the lens and the exposure window such that the orthogonal projection of the light source directly on the diffuser plate corresponds to the greatest surface of the plate that is seen by the lens.

2. Enlarger according to claim 1, further comprising light source adjustment means for enabling movement of the light source in relation to the diffuser plate.

3. Enlarger according to claim 2, wherein the adjustment means has an extreme adjustment position at which the annular light source is applied to the diffuser plate.

4. Enlarger according to either of claims 2 or 3, wherein the enlarger head has a side wall at a side thereof extending generally along the axis of the light source; the adjustment means comprises a light source holding arrangement secured in a mobile manner sliding along the side wall of the enlarger head.

5. Enlarger according to claim 1, wherein the diameter of the annular source is larger than the diagonal dimension of the exposure window.

6. Enlarger according to claim 1, wherein, the distance between the light source and the diffuser plate, plus the distance between the diffuser plate and the film-slide and the exposure window thereof is approximately ⅓rd of the lens focal length.

7. Enlarger according to either of claims 5 or 6, wherein the lens has a focal length of 100 mm, the exposure window has a diagonal measure of 90 mm, the projection half-angle from the lens to the diffuser plate for a maximum and minimum enlargement being 22° and 15° respectively.

8. Enlarger according to claim 1 wherein the light source is a lamp in the form of an annular tube.

9. Enlarger according to claim 1 wherein the light source is a neon- tube.

10. Enlarger according to claim 1 wherein the exposure window is so shaped that when the light source is located at a distance from the diffuser plate for maximum enlargement, the lens and the light source are so placed that the projection line from the center of the lens and passing along the edges of the exposure window passes through the center of a straight cross-section across the center of the annular light source, whereby the lens sees the light source through the window.

11. Enlarger according to claim 1 wherein the light source is a xenon tube.

* * * * *